United States Patent
Ergler et al.

(10) Patent No.: US 10,185,039 B2
(45) Date of Patent: Jan. 22, 2019

(54) DETECTOR MODULE FOR AN X-RAY DETECTOR

(71) Applicant: Siemens Aktiengesellschaft, München (DE)

(72) Inventors: Thorsten Ergler, Erlangen (DE);
Thomas Reichel, Heroldsbach (DE);
Kurt Stadlthanner, Fuerth (DE); Jan Wrege, Erlangen (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 115 days.

(21) Appl. No.: 14/925,038

(22) Filed: Oct. 28, 2015

(65) Prior Publication Data

US 2016/0131766 A1   May 12, 2016

(30) Foreign Application Priority Data

Nov. 6, 2014   (DE) .................. 10 2014 222 690

(51) Int. Cl.
  *G01T 1/17*   (2006.01)
  *G01T 1/00*   (2006.01)
  *G01T 1/24*   (2006.01)

(52) U.S. Cl.
  CPC ............... *G01T 1/00* (2013.01); *G01T 1/243* (2013.01)

(58) Field of Classification Search
  CPC ....................................................... G01T 1/00
  See application file for complete search history.

(56) References Cited

U.S. PATENT DOCUMENTS

| 4,700,076 A * | 10/1987 | Dorman ................ G01T 1/2928 250/370.09 |
| 4,926,052 A * | 5/1990 | Hatayama ................ G01T 1/24 250/370.01 |
| 6,292,528 B1 * | 9/2001 | Wieczorek ............. A61B 6/032 250/363.02 |

(Continued)

FOREIGN PATENT DOCUMENTS

| DE | 102012100774 A1 | 8/2012 |
| DE | 102012204052 A1 | 9/2013 |
| EP | 2431982 A1 | 3/2012 |

OTHER PUBLICATIONS

German Office Action dated Oct. 6, 2015.
German Office Action dated Jun. 21, 2018.

*Primary Examiner* — David Porta
*Assistant Examiner* — Djura Malevic
(74) *Attorney, Agent, or Firm* — Harness, Dickey & Pierce, P.L.C.

(57) ABSTRACT

A detector module for an x-ray detector is disclosed. In an embodiment, the detector module includes a plurality of sensor boards arranged adjacent to one another on a module carrier. Each sensor board is arranged in a stack formation and includes a sensor layer with a sensor surface, to which a bias voltage can be applied in order to detect x-ray radiation. A voltage supply line is arranged in the stack formation along a lateral surface of the stack formation of each sensor board in order to apply the bias voltage. Moreover, an x-ray detector is disclosed for recording an image of an object irradiated by x-ray radiation, the x-ray detector including a plurality a number of detector modules arranged adjacent to one another.

20 Claims, 3 Drawing Sheets

(56) References Cited

U.S. PATENT DOCUMENTS

| | | | |
|---|---|---|---|
| 6,510,195 B1* | 1/2003 | Chappo | G01T 1/2018 250/208.1 |
| 6,635,866 B2* | 10/2003 | Chan | G02B 6/4292 250/239 |
| 7,223,981 B1* | 5/2007 | Capote | H01L 27/14634 250/370.13 |
| 7,504,637 B2* | 3/2009 | Thorne | G01T 1/2018 250/370.09 |
| 7,541,593 B2* | 6/2009 | Yanagita | A61B 6/037 250/370.08 |
| 7,645,998 B2* | 1/2010 | Danzer | G01T 1/2985 250/370.08 |
| 2002/0064252 A1 | 5/2002 | Igarashi | A61B 6/06 378/19 |
| 2003/0010924 A1* | 1/2003 | El-Hanany | G01T 1/202 250/370.09 |
| 2003/0016779 A1* | 1/2003 | Pohan | A61B 6/035 378/19 |
| 2003/0047679 A1* | 3/2003 | Cornish | H01J 49/025 250/287 |
| 2004/0004189 A1* | 1/2004 | Brahme | G01T 1/24 250/370.08 |
| 2005/0067577 A1* | 3/2005 | Yanagita | G01T 1/2928 250/370.09 |
| 2005/0211879 A1* | 9/2005 | Iwakiri | H01L 27/14676 250/214.1 |
| 2006/0071173 A1* | 4/2006 | Zeman | G01T 1/249 250/370.11 |
| 2007/0121781 A1* | 5/2007 | Meirav | A61B 6/032 378/19 |
| 2008/0165921 A1* | 7/2008 | Tkaczyk | A61B 6/032 378/19 |
| 2008/0253507 A1* | 10/2008 | Levene | G01T 1/2018 378/19 |
| 2010/0308230 A1* | 12/2010 | Yanagita | G01T 1/249 250/370.09 |
| 2011/0297837 A1 | 12/2011 | Ishitsu | |
| 2012/0071014 A1 | 3/2012 | Dais et al. | |
| 2012/0193545 A1 | 8/2012 | Tkaczyk et al. | |
| 2013/0240249 A1 | 9/2013 | Jahnel et al. | |
| 2013/0327949 A1* | 12/2013 | Dezord | G01T 1/2928 250/394 |

* cited by examiner

FIG 5

DETECTOR MODULE FOR AN X-RAY DETECTOR

PRIORITY STATEMENT

The present application hereby claims priority under 35 U.S.C. § 119 to German patent application number DE 102014222690.2 filed Nov. 6, 2014, the entire contents of which are hereby incorporated herein by reference.

FIELD

At least one embodiment of the invention generally relates to a detector module for an x-ray detector. Moreover at least one embodiment of the invention generally relates to an x-ray detector having a number of detector modules.

BACKROUND

An x-ray detector, in particular a quanta-counting x-ray detector, is used in imaging applications such as for instance within the scope of computed tomography recordings in medical imaging to generate a spatial image of an examination region of a patient.

An x-ray detector, the sensor layer of which is embodied as a direct-converting semiconductor layer, here enables a quantitative and energy-selective recording of individual x-ray quanta. During the incidence of x-ray radiation, electron-hole-pairs, in other words pairs made up of negative and positive charge carriers, are generated in the sensor layer. On account of a voltage applied to the sensor layer or to the surface of the sensor layer, subsequently also referred to as bias voltage, the charger carriers are separated and move toward the respective oppositely charged electrodes or surfaces of the sensor layer. The electric current produced here or a corresponding charge transfer can be evaluated by downstream sensor electronics. Semiconductor materials in the form of CdTe, CdZnTe, CdTeSe, CdZnTeSe, CdMnTe, GaAs, Si or Ge which have a high absorption cross-section for x-ray radiation are suited for instance to detecting the x-ray quanta.

Large-scale x-ray detectors are required in particular for a computed tomography system, to which end a number of comparably small detector modules with the afore-described design are frequently arranged adjacent to one another in the so-called arm direction, in other words the direction referred to as the p-coordinate of the x-ray detector. Detector modules of this type consist in turn of individual sensor boards, which, in a z-direction, in other words in the direction in which the patient advances into the computed tomography system, are arranged adjacent to one another at a distance of approximately 100 µm on a shared module carrier and their sensor layers together form the sensor surface of a detector module.

SUMMARY

The subdivision of the sensor surface of a detector module by the use of individual sensor boards on the one hand allows for a targeted scaling and thus an increase in the light yield of a detector. On the other hand, a corresponding subdivision, in other words by using a certain number of sensor boards, can also achieve improved adjustment of the sensor surface to a desired detector geometry, for instance to approximate the spherical distribution of the x-rays.

A further advantage of the use of a number of adjacent sensor boards is the possibility, in the event of a malfunction of a sensor element (pixel) on the sensor surface of a detector, of implementing a repair by replacing only the sensor board affected by the malfunction.

In order to provide the necessary bias voltage, which in the case of direct-converting detectors usually lies in a range between 500 V and 2000 V, voltage supply lines are currently used, which, in each case for a sensor board starting from a laterally-spaced connecting pin, are guided in parallel to the corresponding sensor layer and have contact therewith. After a final application the voltage supply line can no longer be detached without material being damaged. If the desire is to integrate a number of sensor boards onto a detector module, the voltage supply thereof must be provided across all sensor boards. If the replaceability of the sensor boards is to be preserved, with the known voltage supply line only two sensor boards can be integrated into a detector module.

An embodiment of the invention provides a detector module, which offers the possibility of increasing the number of sensor boards integrated therein and nevertheless allows for the replacement of individual sensor boards.

An embodiment of the invention provides an x-ray detector with a number of correspondingly embodied detector modules.

An embodiment of the invention is directed to a detector module for an x-ray detector, comprising a number of sensor boards arranged adjacent to one another on a module carrier, wherein each sensor board in a stack formation comprises a sensor layer with a sensor surface, to which a bias voltage can be applied in order to detect x-ray radiation, and wherein in the stack formation a voltage supply line for applying the bias voltage is arranged along a lateral surface of the stack formation of each sensor board.

An embodiment of the invention is directed to an x-ray detector for recording an image of an object irradiated by x-ray radiation, comprising a plurality of detector modules according to one of the afore-described embodiments.

BRIEF DESCRIPTION OF THE DRAWINGS

Further example embodiments for the x-ray detector will become apparent from the subclaims focusing on the detector module. Thus the advantages cited for the detector module can be transferred analogously here to the x-ray detector.

Example embodiments of the invention are explained in more detail below with reference to a drawing, in which.

DETAILED DESCRIPTION OF THE EXAMPLE EMBODIMENTS

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Various example embodiments will now be described more fully with reference to the accompanying drawings in which only some example embodiments are shown. Specific structural and functional details disclosed herein are merely representative for purposes of describing example embodiments. The present invention, however, may be embodied in many alternate forms and should not be construed as limited to only the example embodiments set forth herein.

Accordingly, while example embodiments of the invention are capable of various modifications and alternative forms, embodiments thereof are shown by way of example in the drawings and will herein be described in detail. It should be understood, however, that there is no intent to limit example embodiments of the present invention to the particular forms disclosed. On the contrary, example embodiments are to cover all modifications, equivalents, and alternatives falling within the scope of the invention. Like numbers refer to like elements throughout the description of the figures.

Before discussing example embodiments in more detail, it is noted that some example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Specific structural and functional details disclosed herein are merely representative for purposes of describing example embodiments of the present invention. This invention may, however, be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items. The phrase "at least one of" has the same meaning as "and/or".

Further, although the terms first, second, etc. may be used herein to describe various elements, components, regions, layers and/or sections, it should be understood that these elements, components, regions, layers and/or sections should not be limited by these terms. These terms are used only to distinguish one element, component, region, layer, or section from another region, layer, or section. Thus, a first element, component, region, layer, or section discussed below could be termed a second element, component, region, layer, or section without departing from the teachings of the present invention.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, term such as "below" can encompass both an orientation of above and below. The device may be otherwise oriented (rotated 90 degrees or at other orientations) and the spatially relative descriptors used herein are interpreted accordingly.

Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

An embodiment of the invention is directed to a detector module for an x-ray detector, comprising a number of sensor boards arranged adjacent to one another on a module carrier, wherein each sensor board in a stack formation comprises a sensor layer with a sensor surface, to which a bias voltage can be applied in order to detect x-ray radiation, and wherein in the stack formation a voltage supply line for applying the bias voltage is arranged along a lateral surface of the stack formation of each sensor board.

As described above, it is desirable with x-ray detectors such as are used within the scope of computed tomography to adjust the detector geometry in particular to the spherical distribution of the x-rays used for examination purposes. This takes place by means of a corresponding alignment of the individual sensor boards. Adjustment of the detector geometry to a desired form can be more precise the more sensor boards are present on a detector module.

In an embodiment of the invention, each sensor board integrated in a detector module is supplied by a separate voltage supply line, which runs along a lateral surface of the stack formation to the sensor surface.

This ensures that each sensor board of a detector module is supplied with the required bias voltage and an individual sensor board can at the same time be replaced without in the process having to accept damage to the further sensor boards arranged on the detector module and thus adversely affecting the function of the detector module. With a voltage supply line running laterally along the respective stack formation, a voltage supply across the sensor boards is then not required in the case of a number of sensor boards integrated adjacent to one another. The number of possible sensor boards in a detector module can thus be increased without loss of replaceability for adjustment to a desired geometry.

The bias voltage is in particular a high voltage, which is applied via the voltage supply line to the sensor surface of the sensor board. The voltage supply line can also be referred to as a voltage supply or as a high voltage supply. The voltage supply line can be embodied for instance as a film, which is glued along the lateral surface of the stack formation. Alternatively, the voltage supply line can also be attached to the lateral surface of the stack formation within the scope of a spraying method.

The voltage supply line expediently extends from the lateral surface of the stack formation to the sensor surface of the respective sensor board. The voltage supply line preferably extends beyond the sensor surface. In particular, the voltage supply line on the sensor surface is embodied as a full overlap and in this respect in other words forms a conductive layer there. The conductive layer can be applied to the sensor surface as a conductive coating or as a conductive film for instance.

The sensor layer of a sensor board is usually attached in the stack formation to a read-out unit, in particular an ASIC. This arrangement is also referred to as a hybrid. In particular, the voltage supply line extends here from the lateral surface of the hybrid at least to the sensor surface of the respective sensor board or partially or completely covers the sensor surface.

A resistance layer is preferably arranged between the lateral surface of the sensor board and the voltage supply line. In other words, the voltage supply line is spaced from the lateral surface of the stack formation by way of the resistance layer. By means of a resistance layer between the sensor board and the voltage supply, a disruption in the field profile on the lateral surface of the sensor board or the sensor layer is prevented, which could have adverse effects on the detector quality. The resistance layer expediently consists of a high-resistance, poorly conductive material, the resistance of which preferably lies in a range of a few megaohms up to a few gigaohms, so that only a minimal current flows. A suitably coated adhesive tape can be used for instance as a resistance layer. Alternatively, a direct coating of the sensor surface with a suitable resistance layer or a layer sequence made of insulation layers, resistance layers and conductive layers is also suitable.

The voltage supply line is particularly preferably arranged between two resistance layers on the lateral surface of the stack formation of the sensor board. In other words, the voltage supply line on the lateral surface is "embedded" between two resistance layers. Such an embedding prevents both the disruption of the field profile on the lateral surface of the stack formation of the respective sensor board and also a disruption of the field profile in an adjacent sensor board. In other words, a "capacitive" voltage supply line on the side of the sensor board or the hybrid is produced as part of the sensor board. A smooth field profile can be produced across the or each resistance layer, in particular along the sensor material. In particular, a field scattering to the outside can be prevented.

The or each resistance layer is advantageously connected between the ground or the ground potential and bias voltage. In other words, the bias voltage along the or each resistance layer falls. For instance, the resistance layer on the top side of the sensor board is connected to the bias voltage, e.g. −1000V and on the lower side with 0V (ground or ground potential). In this way the potential along the sensor layer decreases linearly, which results in a smooth and straight field profile. Overall the field profile can be influenced in a targeted manner by a suitable resistance curve. As an alternative to a linear field profile, a non-linear profile form which deviates from the linear form is also possible.

An insulation layer is further preferably arranged between the voltage supply line and the or each resistance layer. The voltage supply line is thus spaced from the or each resistance layer by way of the insulation layer. Unwanted electrical contacts between the resistance layer and the voltage supply line are prevented by means of insulation layers of such a type. The voltage supply line covering the sensor surface is also preferably, in particular fully covered by an insulation layer.

The voltage supply line, the resistance layers and the insulation layers can be applied separately and consecutively to the lateral surface of the stack formation and/or to the sensor surface or, in the case of a conductive layer applied to the sensor surface, to the conductive layer itself. It is likewise essentially possible to produce the voltage supply line, the resistance layers and the insulation layers in advance as a composite unit and then to arrange them as a unit on the sensor board.

The sensor layer is, as already mentioned, preferably applied in the stack formation of a read-out unit, which is also referred to as a hybrid. The read-out unit is further preferably applied to a substrate in the stack formation. The substrate is particularly preferably a ceramic carrier, which can be used as an intermediate substrate for signal transmission purposes from the read-out unit to corresponding module electronics and likewise serves to draw off the heat produced in the sensor layer in particular onto the metallic module carrier. The voltage supply is preferably provided along the side of the ceramic carrier, in other words on the lateral surface of the ceramic carrier (or generally on the lateral surface of the substrate).

The sensor layer preferably comprises cadmium telluride (CdTe), cadmium zinc telluride (CdZnTe), cadmium zinc telluride selenide (CdZnTeSe), cadmium telluride selenide (CdTeSe), cadmium manganese telluride (CdMnTe), indium phosphide (Inp), thallium bromide (TlBr2) or mercury iodide (HgI2). Semiconductor materials of this type enable the direct conversion of the radiation striking them into an electrical signal and are commercially available of high quality in respect of charge transportation characteristics and homogeneity.

An embodiment of the invention is directed to an x-ray detector for recording an image of an object irradiated by x-ray radiation, comprising a plurality of detector modules according to one of the afore-described embodiments.

During operation of an x-ray detector, a bias voltage, in particular a high voltage, is applied to the sensor surface of the detector modules in each case. By means of the applied bias voltage, the separation of the charge carriers generated by the x-ray radiation and thus the detection of the incident x-ray quanta is enabled in the sensor layer as described above. The number of detector modules used in an x-ray detector and thus the number of sensor boards are in particular dependent on the size of the sensor boards and on the required overall sensor surface.

The substrate of a detector module in the stack formation is expediently connected to sensor electronics by way of the module carrier. Thus the data determined during an x-ray image recording, in other words the electrical signals from the direct conversion of the x-ray radiation striking a sensor surface, can be directly evaluated and used further. To this end, the sensor electronics can be read out for instance with a corresponding evaluation routine.

Figure 1:
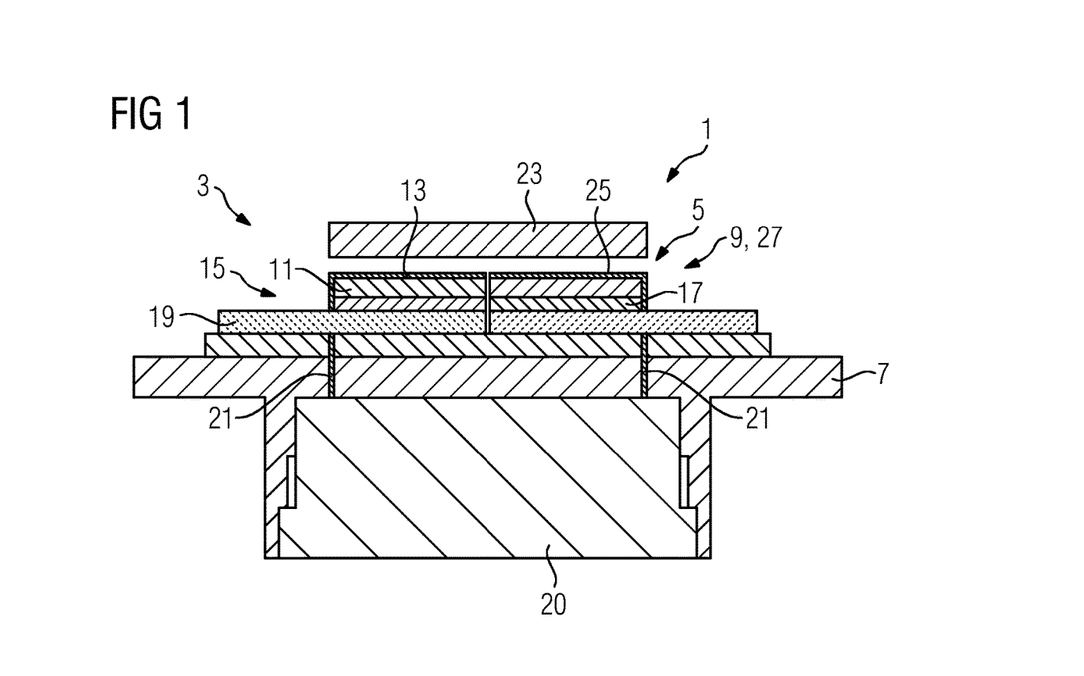
FIG. 1 shows a detector module of an x-ray detector with two adjacent sensor boards in a lateral view.

A detector module 1 of an x-ray detector 3 is shown in FIG. 1. The detector module 1 has a tiled modular design, in which two sensor boards 5 are arranged adjacent to one another on a shared metallic module carrier 7.

In a stack formation 9 both sensor boards 5 each comprise a sensor layer 11 with a sensor surface 13. The sensor layer 11 here consists of cadmium telluride and serves to detect x-ray radiation. The sensor layer 11 is applied by forming a hybrid 15 of a read-out unit 17, which in turn is arranged on a substrate 19 embodied as a ceramic carrier. In the stack formation 9 the ceramic carrier 19 is connected by way of the module carrier 7 to sensor electronics 20, from which outgoing data lines 21 run to the respective sensor boards 5.

In addition, a collimator 23 in the form of a metal block covering the sensor surface 13 is used, which serves to generate a parallel radiation path.

In order to detect x-ray radiation, for instance within the scope of computed tomography recordings, in the integrated state within the x-ray detector 3 a high voltage as a bias voltage is applied to the sensor surfaces 13 of the two sensor boards 5. Here the voltage supply is provided by way of two voltage supply lines 25 conducting bias voltage in each case, wherein each voltage supply line 25 is assigned in each case to one of the two sensor boards 5 and this is supplied with bias voltage in a targeted manner. The separate voltage supply lines 25 are to this end each guided along a lateral surface 27 of the stack formation 9 of the respective sensor board 5. The voltage supply lines 25 are embodied as films.

Figure 2:
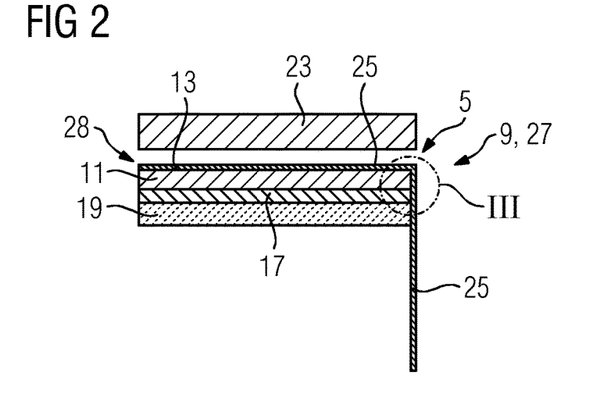
FIG. 2 shows a sensor board of the detector module according to FIG. 1 in a lateral view.

FIG. 2 shows a cutout of one of the two sensor boards 5 of the detector module 1 according to FIG. 1. On the basis of the representation, the arrangement of the respective voltage supply line 25 along the lateral surface 27 of the stack formation 9 of the sensor board 5 can be clearly identified. The following description for the one sensor board 5 can naturally be transferred analogously to the further sensor board 5 used in the detector module 1.

The voltage supply of the sensor layer 11 is provided from the underside 29 of the sensor board 5. To this end, the voltage supply line 25 runs along the lateral surface 27 of the stack formation 9 and extends from the lateral surface 27 to the sensor surface 13 of the sensor board 5. By way of example the voltage supply line 25 here completely covers the sensor surface 13.

It is further possible to additionally provide the sensor board 5 with a conductive layer, which is applied to the sensor surface 13. The position of the conductive layer is indicated by the arrow 28. In this case, the voltage supply line 25 runs along the lateral surface 27 of the stack formation 9 and extends from the lateral surface 27 to the conductive layer applied to the sensor surface 13.

Figure 3:
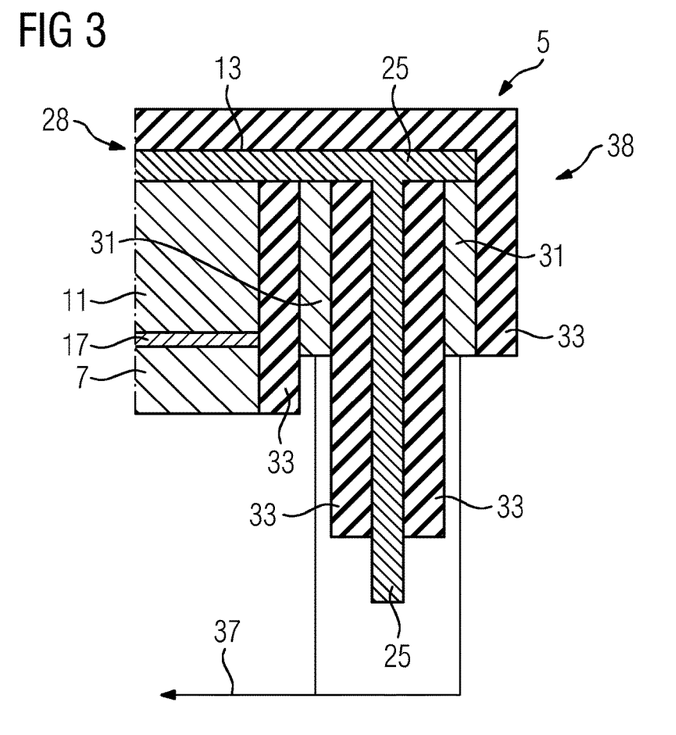
FIG. 3 shows a detailed view of the sensor board according to FIG. 2.

In order to clarify the arrangement of the voltage supply line 25 on the lateral surface 27, an enlarged detailed view of a cutout of the sensor board 5 according to FIG. 2 is shown in FIG. 3. On the basis of this enlarged representation, resistance layers 31 and insulation layers 33 arranged on the sensor board 5 can now be seen. Resistance layers 31 and insulation layers 33 can naturally be arranged on both lateral surfaces 27.

The voltage supply line 25 is arranged or "embedded" on the lateral surface 27 of the stack formation 9 between two resistance layers 31. Here the resistance layer 31 facing the lateral surface 27 of the stack formation 9 spaces the high voltage supply line 25 from the lateral surface 27. The resistance layers 31 result in a smoothing of the field profile or in a field homogenization along the sensor material. This is explained in more detail following the description relating to FIG. 3 and FIG. 4.

The resistance layers 31 embedded in the voltage supply line 25 are connected on their upper end by means of an electrical connection to the respective voltage supply line 25 with the bias voltage of e.g. −1000 V. On their lower end, both resistance layers 31 are set to ground or ground potential 37. The field profile can be influenced in a targeted manner by a suitable resistance curve. If the potential in the resistance layer 31 changes in a defined manner, a defined field profile also results in the sensor layer 11 or in the sensor material.

Moreover, four insulation layers 33 are arranged on the sensor board 5, of which one insulation layer 33 is applied to the voltage supply line 25 covering the sensor surface 13.

This insulation layer 33 outwardly covers both the voltage supply line 25 and also the outer resistance layer 31.

Two further insulation layers 33 are arranged between the resistance layers 31 and the voltage supply line 25, the insulation layers thus spacing the voltage supply line 25 from the resistance layers 31. The resistance layer 31 next to the sensor board 5 or the lateral surface 27 of the stack formation 9 is spaced from the lateral surface 27 by means of a further insulation layer 33.

Figure 4:
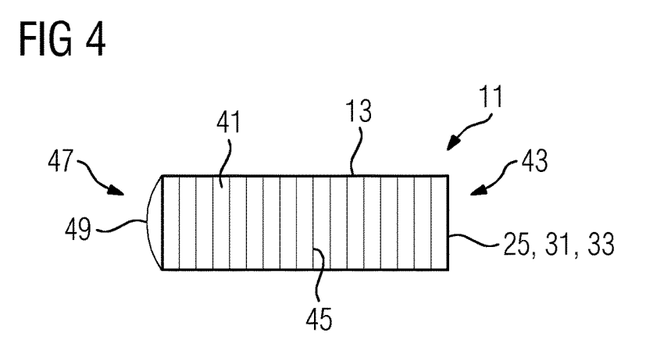
FIG. 4 shows a sensor layer of a sensor board with field lines running in the sensor material.

FIG. 4 shows the sensor layer 11 of the sensor board 5, wherein here the field line profile 41 along the sensor material 11 is drawn. On the right side 43 shown in the Figure, the field lines 45 run smoothly and homogenously in a straight line through the sensor material. This straight field profile 41 is achieved by the resistance layers 31 arranged on the right side 43, the resistance layers being contacted on the top side 35 with the bias voltage of −1000 V and on the lower side 29 with the ground 37, as already described in FIG. 3. With a defined change in the potential in the resistance layer 31, a defined field profile also results in the sensor layer or in the sensor material of the sensor layer 11.

Moreover, the resistance layers 31 ensure that the field profile 41 is also not disrupted in an adjacent sensor board 5 or in the sensor material of a sensor layer 11 of a corresponding sensor board 5.

The field profiles 49 extend on the left, open side 47 of the sensor layer 11, on which no resistance layer 31 is arranged, in a curved manner outwards. In other words, an unwanted inhomogeneous field profile is present there along the sensor layer 11. Due to the absence of a resistance layer 31 at this point 47, the field profile 41 is not smoothed there.

Figure 5:
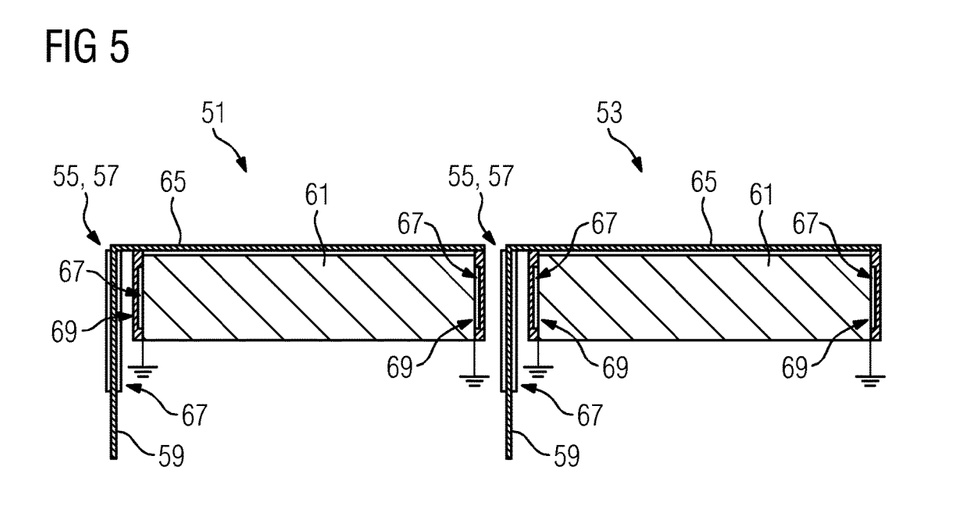
FIG. 5 shows two adjacent sensor boards as part of a detector module in a lateral view.

FIG. 5 shows a cutout of two adjacent sensor boards 51, 53 in a lateral view. Voltage supply lines 59 are guided along in each case a lateral surface 55 of the stack formation 57 of both sensor boards 51, 53, the voltage supply lines supplying a bias voltage to the sensor layers 61 from the lower side of the sensor board 51, 53.

Both voltage supply lines 29 run along the lateral surfaces 55 of the stack formation 57 and extend from the respective lateral surface 55 to the sensor surface 65 of the sensor board 51, 53. The voltage supply lines 59 are each encased by an insulation layer 67.

A resistance layer 69, which is fastened at certain points on the lateral surface 55 is disposed on the lateral surfaces 55 of the sensor boards 51, 53. A further insulation layer 67 is arranged between the resistance layer 69 and the lateral surface 55, the insulation layer spacing the resistance layer 69 from the lateral surface 55 in each case. The resistance layers 69 result in a smoothing of the field profile or in a field homogenization along the sensor layer or the sensor material.

Such a field homogenization on both lateral surfaces 55 of the sensor boards 51, 53 is achieved here in that in addition a resistance layer 69, which is spaced from the lateral surface 55 by way of an insulation layer 67, is likewise arranged on the lateral surfaces 55 on which no voltage is supplied, in other words on the lateral surfaces 55 which are free of a voltage supply line 59. In this way, with a suitable resistance curve, the field profile can be influenced in a targeted manner on both sides, in other words on both lateral surfaces 55 of the sensor boards 51, 53.

The aforementioned description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

The patent claims filed with the application are formulation proposals without prejudice for obtaining more extensive patent protection. The applicant reserves the right to claim even further combinations of features previously disclosed only in the description and/or drawings.

The example embodiment or each example embodiment should not be understood as a restriction of the invention. Rather, numerous variations and modifications are possible in the context of the present disclosure, in particular those variants and combinations which can be inferred by the person skilled in the art with regard to achieving the object for example by combination or modification of individual features or elements or method steps that are described in connection with the general or specific part of the description and are contained in the claims and/or the drawings, and, by way of combinable features, lead to a new subject matter or to new method steps or sequences of method steps, including insofar as they concern production, testing and operating methods. Further, elements and/or features of different example embodiments may be combined with each other and/or substituted for each other within the scope of this disclosure and appended claims.

References back that are used in dependent claims indicate the further embodiment of the subject matter of the main claim by way of the features of the respective dependent claim; they should not be understood as dispensing with obtaining independent protection of the subject matter for the combinations of features in the referred-back dependent claims. Furthermore, with regard to interpreting the claims, where a feature is concretized in more specific detail in a subordinate claim, it should be assumed that such a restriction is not present in the respective preceding claims.

Since the subject matter of the dependent claims in relation to the prior art on the priority date may form separate and independent inventions, the applicant reserves the right to make them the subject matter of independent claims or divisional declarations. They may furthermore also contain independent inventions which have a configuration that is independent of the subject matters of the preceding dependent claims.

Still further, any one of the above-described and other example features of the present invention may be embodied in the form of an apparatus, method, system, computer program, tangible computer readable medium and tangible computer program product. For example, of the aforementioned methods may be embodied in the form of a system or device, including, but not limited to, any of the structure for performing the methodology illustrated in the drawings.

In this application, including the definitions below, the term 'module' or the term 'controller' may be replaced with the term 'circuit.' The term 'module' may refer to, be part of, or include processor hardware (shared, dedicated, or group)

that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

Further, at least one embodiment of the invention relates to a non-transitory computer-readable storage medium comprising electronically readable control information stored thereon, configured in such that when the storage medium is used in a controller of a magnetic resonance device, at least one embodiment of the method is carried out.

Even further, any of the aforementioned methods may be embodied in the form of a program. The program may be stored on a non-transitory computer readable medium and is adapted to perform any one of the aforementioned methods when run on a computer device (a device including a processor). Thus, the non-transitory, tangible computer readable medium, is adapted to store information and is adapted to interact with a data processing facility or computer device to execute the program of any of the above mentioned embodiments and/or to perform the method of any of the above mentioned embodiments.

The computer readable medium or storage medium may be a built-in medium installed inside a computer device main body or a removable medium arranged so that it can be separated from the computer device main body. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

None of the elements recited in the claims are intended to be a means-plus-function element within the meaning of 35 U.S.C. § 112(f) unless an element is expressly recited using the phrase "means for" or, in the case of a method claim, using the phrases "operation for" or "step for."

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A detector module for an x-ray detector, comprising:
a plurality of sensor boards arranged adjacent to one another on a module carrier, the plurality of sensor boards being arranged in a stack formation and each of the plurality of sensor boards including
a sensor layer including a sensor surface, configured to receive a bias voltage to detect x-ray radiation, and
a voltage supply line to apply the bias voltage,
wherein each respective voltage supply line is arranged along a lateral surface of the stack formation of each respective sensor board of the plurality of sensor boards and extends from the lateral surface to completely cover the respective sensor surface of each respective sensor board, and
wherein each respective voltage supply line is arranged between a pair of resistance layers to space each respective voltage supply line from the lateral surface of the stack formation of each respective sensor board.

2. The detector module of claim 1, wherein the bias voltage drops across at least one respective resistance layer of each respective pair of resistance layers.

3. The x-ray detector for recording an image of an object irradiated by x-ray radiation, comprising:
a plurality of the detector modules of claim 2, arranged adjacent to one another.

4. The x-ray detector of claim 3, wherein the substrate of each of the detector modules in the stack formation is connected to sensor electronics via the module carrier.

5. The detector module of claim 1, wherein an insulation layer is arranged between the respective voltage supply line and one respective resistance layer of each respective pair of resistance layers.

6. The x-ray detector for recording an image of an object irradiated by x-ray radiation, comprising:
a plurality of the detector modules of claim 5, arranged adjacent to one another.

7. The x-ray detector of claim 6, wherein the substrate of each of the detector modules in the stack formation is connected to sensor electronics via the module carrier.

8. The detector module of claim 1, wherein an insulation layer is applied to the respective voltage supply line extending across the respective sensor surface.

9. The detector module of claim 1, wherein each respective sensor layer in the stack formation is applied to a read-out unit.

10. The detector module of claim 9, wherein the read-out unit in the stack formation is applied to a substrate.

11. The detector module of claim 1, wherein each respective sensor layer comprises cadmium telluride (CdTe), cadmium zinc telluride (CdZnTe), cadmium zinc telluride selenide (CdZnTeSe), cadmium telluride selenide (CdTeSe), cadmium manganese telluride (CdMnTe), indium phosphide (InP), thallium bromide (TlBr$_2$) or mercury iodide (HgI$_2$).

12. The x-ray detector for recording an image of an object irradiated by x-ray radiation, comprising:
a plurality of the detector modules of claim 1, arranged adjacent to one another.

13. The x-ray detector of claim 12, wherein the substrate of each of the detector modules in the stack formation is connected to sensor electronics via the module carrier.

14. The x-ray detector-of claim 12, wherein each respective voltage supply line extends across the sensor surface of each respective one of the plurality of sensor boards.

15. The x-ray detector-of claim 12, wherein each respective sensor layer in the stack formation is applied to a read-out unit.

16. The detector module of claim 15, wherein the read-out unit in the stack formation is applied to a substrate.

17. The x-ray detector-of claim 12, wherein each respective sensor layer comprises cadmium telluride (CdTe), cadmium zinc telluride (CdZnTe), cadmium zinc telluride selenide (CdZnTeSe), cadmium telluride selenide (CdTeSe), cadmium manganese telluride (CdMnTe), indium phosphide (InP), thallium bromide (TlBr$_2$) or mercury iodide (HgI$_2$).

18. The detector module of claim 1, wherein each respective voltage supply line is arranged between a pair of resistance layers to reduce disruption of a field profile on the lateral surface of the stack formation of the respective sensor board.

19. The detector module of claim 18, wherein each respective voltage supply line is arranged between a pair of resistance layers to further reduce disruption of a field profile of an adjacent sensor board.

20. The detector module of claim 1, wherein each respective voltage supply line is arranged between a pair of resistance layers to reduce disruption of a field profile of an adjacent sensor board.

* * * * *